United States Patent
Sugata et al.

(10) Patent No.: US 6,702,199 B1
(45) Date of Patent: Mar. 9, 2004

(54) COOLANT FEEDING DEVICE OF MACHINE TOOL

(75) Inventors: Shinsuke Sugata, Fukuyama (JP); Takashi Kobayashi, Fukuyama (JP)

(73) Assignee: Horkos Corp., Fukuyama (JP)

( * ) Notice: Subject to any disclaimer, the term of this patent is extended or adjusted under 35 U.S.C. 154(b) by 0 days.

(21) Appl. No.: 09/958,120

(22) PCT Filed: Apr. 17, 2000

(86) PCT No.: PCT/JP00/02523

§ 371 (c)(1),
(2), (4) Date: Oct. 4, 2001

(87) PCT Pub. No.: WO00/62973

PCT Pub. Date: Oct. 26, 2000

(30) Foreign Application Priority Data

Apr. 20, 1999 (JP) .......................................... 11-112601

(51) Int. Cl.$^7$ ............................................... B05B 1/24
(52) U.S. Cl. ........................ 239/128; 239/106; 239/119; 239/423; 239/533.15; 239/589; 407/11; 408/56; 408/61; 210/71
(58) Field of Search ................................. 239/104, 106, 239/119, 128, 423, 533.1, 533.15, 589; 408/56, 61; 407/11; 210/168, 171

(56) References Cited

U.S. PATENT DOCUMENTS 4,006,861 A * 2/1977 Alger et al. ................. 239/423
4,778,312 A * 10/1988 Boberg et al. ................ 408/56
6,071,047 A * 6/2000 Nakai .......................... 210/168

FOREIGN PATENT DOCUMENTS

DE 19632472 3/1997
JP 8-118198 5/1996

* cited by examiner

Primary Examiner—Steven J. Ganey
(74) Attorney, Agent, or Firm—Venable LLP; John P. Shannon

(57) ABSTRACT

The present invention prevents coolant from leaking out of a valve (23) after a feed pump (4) stops feeding the coolant, and diminishes a time-lag between the onset of feeding the coolant and mist generation, when the feed pump (4) starts feeding the coolant again. In the machine tool of this invention, the coolant is fed from a feed pump (4) into a mist generating device (13) provided on the tip of a spindle (8) by way of a feed line (7), and a valve (23) is provided at an inflow part for coolant of the mist generating device (13) to be closed when the coolant pressure within the feed line (7) lowers below a fixed level. A coolant sucking and delivering (2) sucks a fixed amount of coolant in the feed line (7), when the feed pump (4) stops feeding the coolant. On the other hand, the device (2) feeds a fixed amount of coolant into the feed line (7), when the feed pump (4) begins feeding the coolant.

6 Claims, 5 Drawing Sheets

COOLANT FEEDING DEVICE OF MACHINE TOOL

FIELD OF THE INVENTION

This invention relates to a coolant feeding device of a machine tool.

BACKGROUND OF THE INVENTION

Prior art references (such as the Japanese Patent Publication No. 66437 of 1997) have disclosed machine tools that feed coolant from a feed pump to a mist generating device at the tip of a spindle through a feed line, and that is provided with a valve means at a coolant inflow portion of the mist generating device. Here, the valve means is to close a coolant path when coolant pressure within the feed line lowers below a fixed level.

In the above conventional machine tools, compressed air is mingled with the coolant inside the feed line, fed from the mist generating device. When the feed pump stops feeding the coolant, compressed air pressure lowers, and then the air expands, thereby causing a little coolant leakage out of the valve means (this phenomenon is called liquid dropping).

The liquid dropping is a waste of coolant. Besides, it widens a timi-lag between the onset of the feed pump and mist production by the mist generating device. Moreover, when generating mist again, the coolant which remains in the mist generating device may spout at a stretch, thereby polluting a work piece and a working environment.

An object of this invention is to provide a coolant feeding device of the machine tool that can solve the above problems.

SUMMARY OF THE INVENTION

To achieve the above object, the present invention is characterized by a machine tool that feeds coolant from a feed pump to a mist generating device on the tip of a spindle by way of a feed line. In this machine tool, a cylinder chamber for compressed air and a cylinder chamber for coolant are provided oppositely. Besides, pistons (30) (31) are provided to the cylinder chambers (28) (29), respectively, and integrated into one body. Moreover, a coolant sucking and delivering means is provided with a compression spring to press the pistons in a specific direction for each cylinder chamber. The means sucks a fixed amount of coolant in the feed line, when the feed pump stops feeding the coolant. Furthermore, the means feeds a fixed amount of coolant into the feed line, when the feed pump begins feeding the coolant.

When the above coolant sucking and delivering means sucks the coolant, the coolant pressure within the feed line lowers at a stretch. Accordingly, usual liquid dropping is prevented.

Beside, when the coolant sucking and delivering means spouts the coolant, the coolant pressure within the feed line rises at a stretch. Accordingly, the coolant is immediately fed into the mist generating device in connection with the onset of coolant feed from the feed pump, thereby bring about a good response of mist generation.

This invention can be materialized as follows.

At a coolant inflow part of the mist generating device is provided a valve means that is closed when the coolant pressure within the feed line is below a fixed level. The valve means is closed immediately, when the feed pump stops feeding the coolant. Therefore, usual liquid dropping is prevented more certainly. On the other hand, when the feed pump begins feeding the coolant, the valve means is open immediately. This enables rapid mist generation.

Besides, the coolant sucking and delivering means sucks the coolant inside the feed line into the cylinder chamber at need, and discharges the sucked coolant into the feed line at need. According to this means, sucking and discharging coolant is easy.

Moreover, the piston is driven by a compressed air fed into the mist generating device for producing mist. Since the compressed air for producing the mist is used for driving the piston, driving mechanism for the piston is simplified.

PREFERRED EMBODIMENT OF THE PRESENT INVENTION

Figure 1:
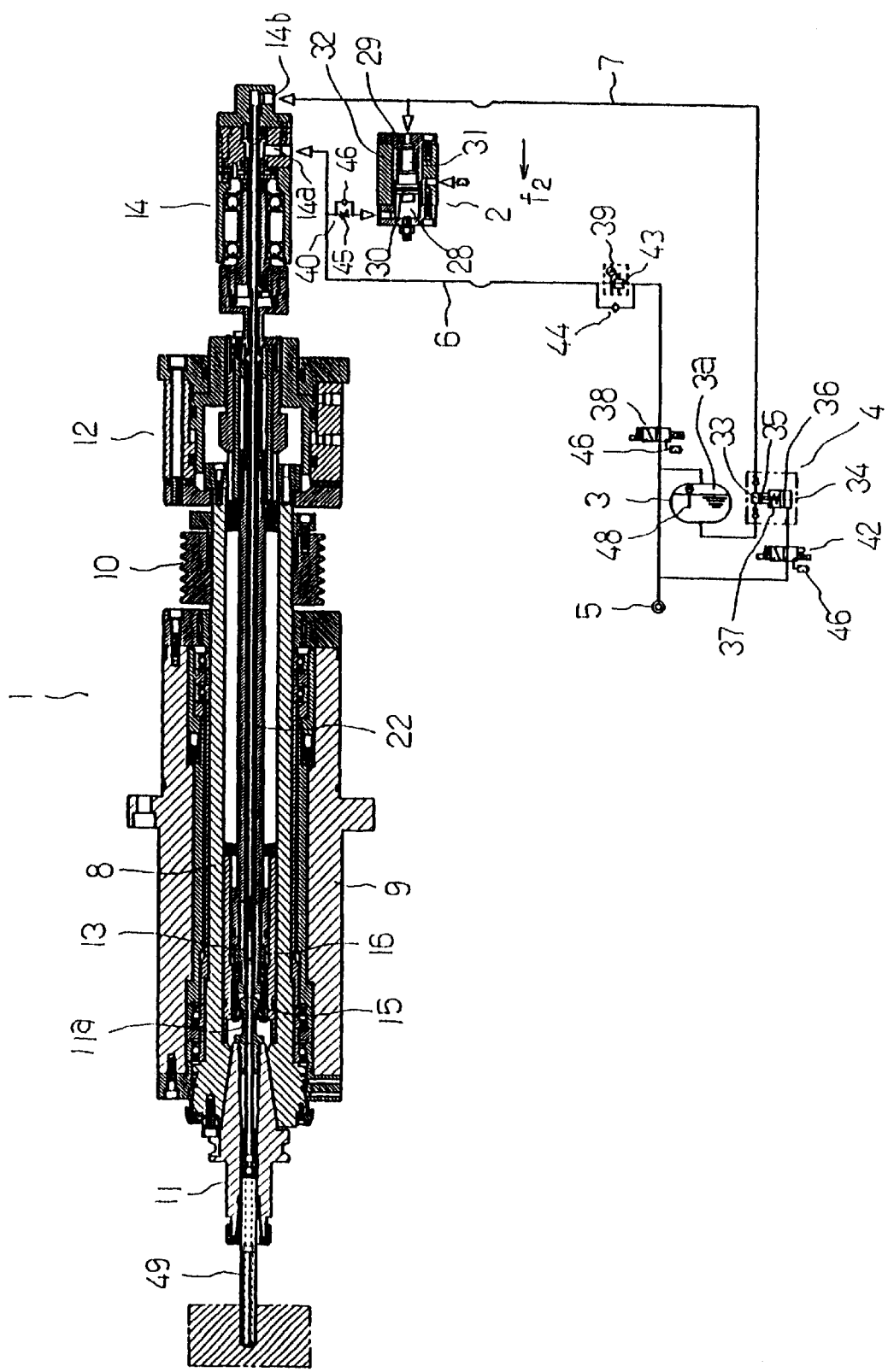
FIG. 1 is a view showing the main part of a machine tool according to this invention.
Figure 2:
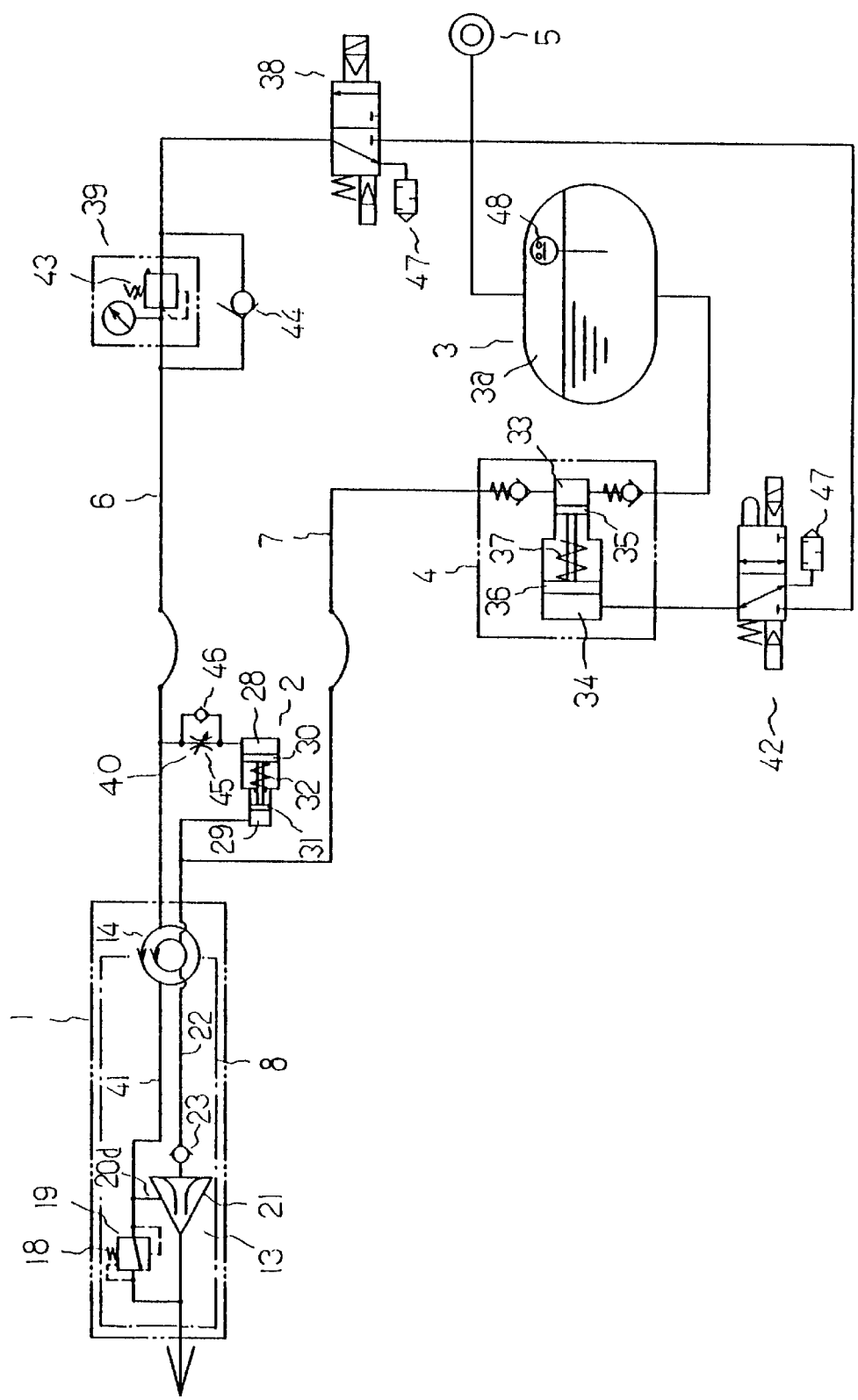
FIG. 2 is an explanatory view diagraming the main part of the machine tool.

A detailed explanation follows about embodiments of the present invention with reference to drawings.

In the drawings, 1 is a spindle unit, 2 is a coolant sucking and delivering means, 3 is a coolant tank, 4 is a feed pump, 5 is a source for compressed air, 6 is a feed line for compressed air, and 7 is a feed line.

The spindle unit 1 comprises a spindle 8, a pulley 10, a clamp actuator 12 and a rotating joint 14. The spindle 8 is rotatably held in a holding cylinder 9 for the spindle. On the rear of the spindle 8 is fixed the pulley 10, into which rotational motive power is input. The clamp actuator 12 is provided on the rear end of the spindle 8 to clamp or unclamp a pull-stud 11a at the rear end of a tool holder 11, which is fixed on the tip end of the spindle 8. The rotating joint 14 is provided on the rear of the actuator 12 to feed the coolant and the compressed air from the outside of the spindle 8 into a mist generating device 13, which is provided inside the tip of the spindle 8.

The mist generating device 13 is integrated into a cylindrical holder 16, which engages with a clamp 15 to clamp the pull-stud 11a. A detailed explanation will follow.

Figure 3:
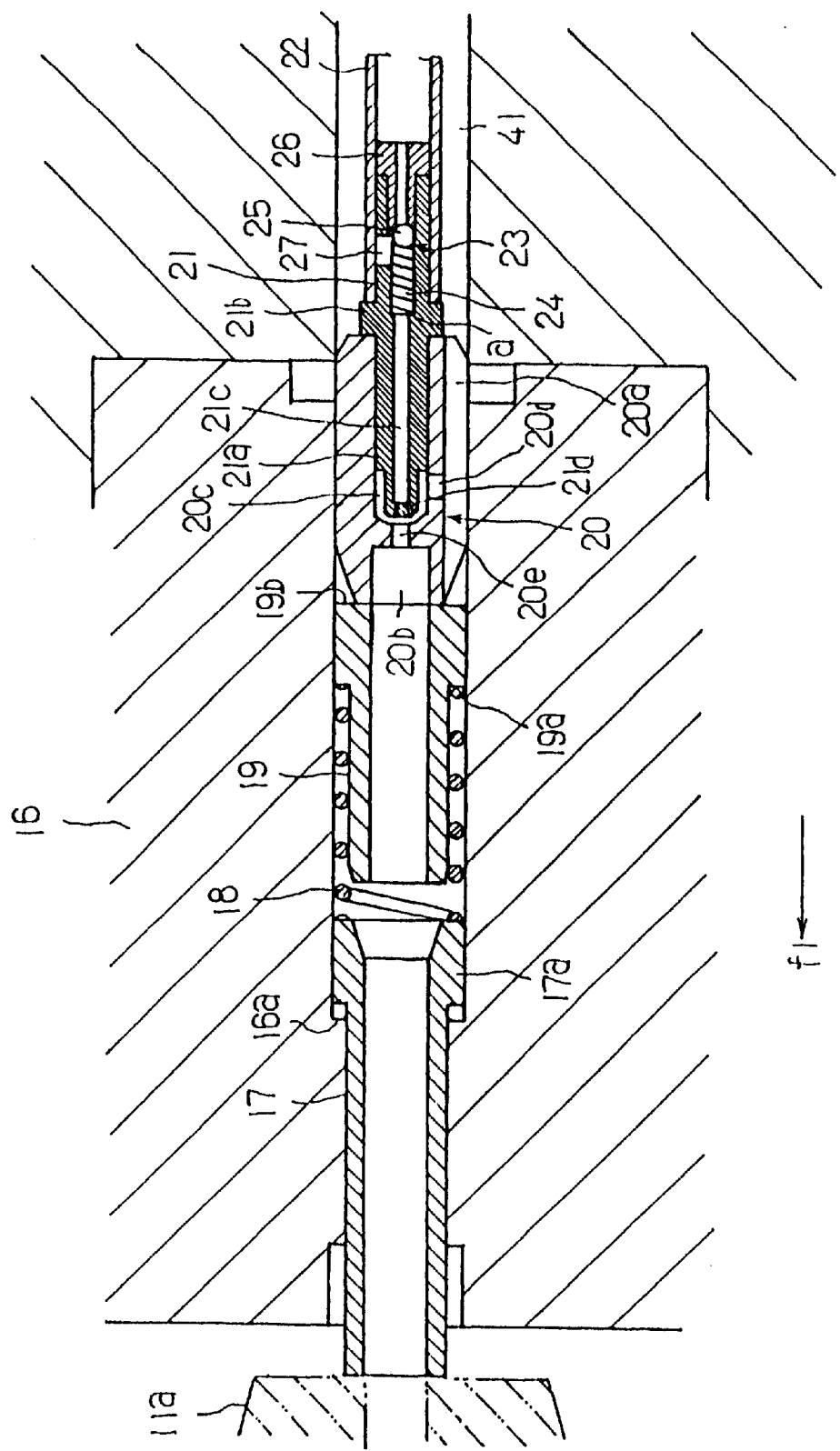
FIG. 3 is a sectional view showing surroundings of a mist generating device of the machine tool according to this invention.

As shown in FIG. 3, a mist discharge cylinder 17, a compression spring 18, a cylindrical valve 19, a mist generating cylinder 20, and a coolant injection nozzle 21 are arranged inside an inner hole of the cylinder member 16 in this order from the front thereof.

The discharge cylinder 17 is provided with a flange 17a on its rear end. The flange 17a is engaged with a stage 16a of the inner hole of the cylindrical holder 16, thereby preventing the discharge cylinder 17 from coming out to the forward f1, and contacting the tip face of the discharge cylinder 17 to the rear face of the pull-stud 11a.

The cylindrical valve 19 is provided with a stage 19a on its circumferential face, and pressed backward by the compression spring 18 which is situated between the stage 19a and the rear face of the discharge cylinder 17. Here, the cylindrical valve 19 is closed when the rear face 19b contacts to the front face of the mist generating cylinder 20, and open when the rear face 19b is away therefrom.

The mist generating cylinder 20 is a cylindrical member, provided with a longitudinal air path groove 20a on the circumferential face of the mist generating cylinder 20, a mist exit hole 20b having a comparative large diameter at the inner front, and a rear inner hole 20c at the inner rear thereof, into which a front 21a of the injecting nozzle 21 is inserted. The inner hole 20c communicates with the air path groove 20a through a side hole 20d, and with the exit hole 20b through a path 20e having a comparative small diameter. Therefore, backward displacement of the mist generating cylinder 20 are prevented by the injecting nozzle 21.

Figure 4:
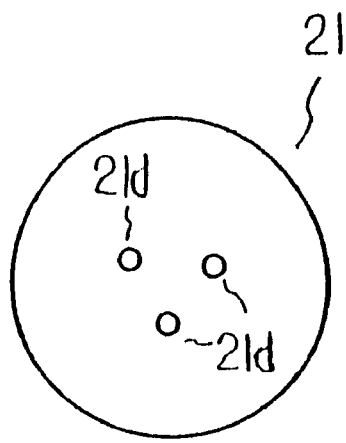
FIG. 4 is a front view showing a part of a coolant injection nozzle of the mist generating device.

The injecting nozzle 21 is provided with a flange 21b on the rear circumferential face of the front 21a. The rear of the flange 21b is fluid-tightly inserted into the tip of a straight coolant feed pipe 22. Besides, at the center of the injecting nozzle 21 is provided a stepped path 21c whose rear is open. As shown in FIG. 4, the front wall of the path 21c is provided with three injection holes 21d. Here, the feed pipe 22 is integrated with the spindle 8 to control backward displacement of the injecting nozzle 21.

The rear of the path 21c is an inflow part for the coolant from the feed pipe 22, and here is provided a valve means 23. Concretely, a compression spring 24 is inserted into the path 21c, and its front end is engaged with a stage "a" of the path 21c. Besides, a globe 25 is provided to the rear end of the compression spring 24, and a cylindrical valve seat 26, which closely fits into the feed pipe 22e, is inserted into the path 21c on the rear of the globe 25. Here, the globe 25 closes a front opening of the cylindrical valve seat 26. Moreover, a notch 27 is formed relative to the position of the globe 25. When the coolant pressure is over the fixed level within the feed pipe 22, the globe 25 is forwardly displaced against elasticity of the spring 18, thereby opening the coolant path. Hence, the coolant flows to the side of the spring 18 from the valve seat 26 through the notch 27. Conversely, when the coolant pressure lowers below the fixed level within the feed pipe 22, the globe 25 is backwardly displaced by the elasticity of the spring 18. Accordingly, the coolant path is closed, and the flowing of the coolant stops.

The means 2 for sucking and discharging coolant has the following constructions. A cylinder chamber 28 for the compressed air and a cylinder chamber 29 for the coolant are formed oppositely, and pistons 30, 31 are provided to the cylinder chambers 28, 29, respectively. These pistons 30, 31 are integrated, and a compression spring 32 is provided to press these pistons 30, 31 in a specified direction f2 for the cylinder chambers 28, 29.

The feed pump 4 has the same construction as the means 2. A cylinder chamber 33 for the coolant and a cylinder chamber 34 for the compressed air are formed oppositely, and pistons 35, 36 are provided to the cylinder chambers 33, 34, respectively. These pistons 35, 36 are integrated, and a compression spring 37 is provided to press these pistons 35, 36 in a specified direction for the cylinder chamber 33, 34.

The feed line 6 for the compressed air connects to an upper closed space 3a of the coolant tank 3 and an inlet 14a for the compressed air of the joint 14 through a direction diverter 38 as well as a pressure adjusting device 39. Besides, the feed line 6 diverges before the inlet 14a, and its branch connects to the cylinder chamber 29 through a discharge regulator 40. The feed line 6 reaches the air groove 20a of the mist generating device 13 from the inlet 14a through a compressed air path 41 which surrounds the feed pipe 22. Moreover, the feed line 6 also diverges at the upper stream of the diverter 38, and its branch connects to the cylinder chamber 34 through a direction diverter 42.

In this case, the adjusting device 39 has a pressure control valve 43 to adjust feed pressure of the compressed air, and a check valve 44 to permit the compressed air in the feed line 6 on the spindle 8 side to flow into the diverter 38. Besides, the regulator 40 has a discharge control valve 45 to adjust a feed rate of the compressed air flowing into the cylinder chamber 28, and a check valve 46 to permit the compressed air to flow out of the cylinder chamber 28.

The feed line 7 connects the bottom of the tank 3 to a suction hole of the cylinder chamber 33. Besides, it connects a discharge hole of the cylinder chamber 33 to a coolant inlet 14b of the joint 14. Moreover, the feed line 7 diverges before the inlet 14b, and its branch connects to the cylinder chamber 29 for coolant. Furthermore, the feed line 7 reaches the inflow part of the mist generating device 13 from the inlet 14b through the straight feed pipe 22.

Here, 47 is a silencer to reduce a noise due to the compressed air flowing out of the diverters 38, 42 to the air. The numeral 48 is a dipstick for coolant, and 49 is a cutting edge fixed on the front of the tool holder 11.

A working example and actions of the machine tool will be explained as follows.

The spindle 8 rotates, when rotations are transmitted to the pulley 12 by a not-illustrated motor. During its rotations, when the diverter 38 is turned to the feed side of the compressed air, the compressed air reaches the groove 20a through the joint 14 and the compressed air path 41 of the spindle 8, and then flows into the inner hole 20c through the side hole 20d. Subsequently, the compressed air spouts toward the exit hole 20b through the path 20e at high speed. During this process, the compressed air is flowing into the cylinder chamber 28, thereby displacing the piston 30 toward the piston 31 against elasticity of the spring 32. Accordingly, the cylinder chamber 29 minimizes its capacity.

At the same time as switching over the diverter 38, the other diverter 42 is repeatedly reciprocated between a feed side and an outflow side of the compressed air at proper intervals. When the diverter 42 is turned to the feed side, the compressed air is fed into the cylinder chamber 34, thereby pressing the piston 36 toward the piston 35 against elasticity of the spring 37. On the other hand, when the diverter 42 is turned to the outflow side, the compressed air flows out of the cylinder chamber 34, thereby displacing the piston 35 in a pressing direction of the spring 37 by its elasticity.

Since the piston 35 is displaced in connection with the piston 36, the cylinder chamber 33 sucks the coolant inside the tank 3 and discharges that, repeatedly. The discharged coolant reaches the valve 23 of the mist generating device 13 through the joint 14 and the straight feed pipe 22. When the forward displacement power of the globe 25 due to the coolant pressure is larger than elasticity of the spring 24, the globe 25 is pressed forward, thereby opening the valve 23. Accordingly, the coolant reaches the front of the inner hole 21c through the valve 23, and then spouts from here through the injection hole 21d.

The spouted coolant is heavily mixed with the compressed air in front of the injection hole 21d, and then made into mist. The mist reaches the rear end of the pull-stud 11a of the tool holder 11 through the exit hole 20e, and inner holes of the cylindrical valve 19 and the discharge cylinder 17. The mist spouts outside from a tip opening of the cutting edge 49 through central holes of the tool holder 11 and the cutting edge 49, lubricating a cut part of a work piece "w" during machining it. Besides, when the mist pressure lowers below the fixed level within the inner hole of the discharge cylinder 17, the cylindrical valve 19 becomes unbalanced in a longitudinal direction, and is displaced forward against elasticity of the spring 18. Therefore, the rear end of the cylindrical valve 19 is separated from the tip of the mist generating cylinder 20, and then through a gap therebetween the compressed air inside the groove 20a flows into an inner hole of the discharge cylinder 20.

During producing the above-mentioned mist, when the diverter 38 is turned to the outflow side, feed of the compressed air into the mist generating device 13 stops immediately. Besides, operation of the feed pump 4 also stops, thereby preventing coolant feed into the feed line 7.

On the other hand, since the compressed air in the cylinder chamber 28 escapes from the diverter 38, the piston 31 in the cylinder chamber 29 is displaced by elasticity of the spring 32. Due to this displacement, a fixed amount of coolant is sucked from the feed line 7, thereby lowering the coolant pressure within the feed pipe 22 at a stretch. Therefore, the valve 23 is closed right after feed of the compressed air stops, thereby preventing the coolant inside the feed pipe 22 from flowing out of the valve 23 into the mist generating device 13. Accordingly, no liquid drops like in the conventional machine tools.

Next, when the diverter 38 is turned to the feed side of the compressed air again under a state that feed of the compressed air stops, the compressed air is fed into the mist generating device 13 through the feed line 6 as is mentioned in the above. This compressed air is fed into the cylinder chamber 28 of the means 2, displacing the piston 30 toward the piston 31 against elasticity of the spring 32. Due to this displacement, a fixed amount of previously sucked coolant is extruded from the cylinder chamber 29, and then the extruded coolant is fed into the feed line 7.

Therefore, the coolant pressure in the feed line 7 on the upper stream of the valve 23 rises at a stretch in connection with feed of the compressed air, and this risen pressure opens the valve 23 immediately. Thereafter, the coolant fed from the feed pump 4 reaches the injection hole 21d through the valve 23. Then, the coolant is made into a mist, and spouted from the tip of the cutting edge 49.

In the above operation, the check valve 46 hastens outflow of the compressed air in the cylinder chamber 28 and the feed line 6 toward the air. Besides, the control valve 45 changes inflow velocity of the compressed air into the cylinder chamber 28, and adjusts outflow velocity of the coolant from the cylinder chamber 29 on the onset of feeding the compressed air into the feed line 6. Hence, the control valve 45 changes a speed in increasing pressure of the coolant inside the feed line 7.

In the above embodiment, the feed pump 4 can be of an optional mechanism. For example, the piston 36 in the cylinder chamber 34 can be driven by an electric motor or compressed air irrelevant to the feed line 6.

Figure 5:
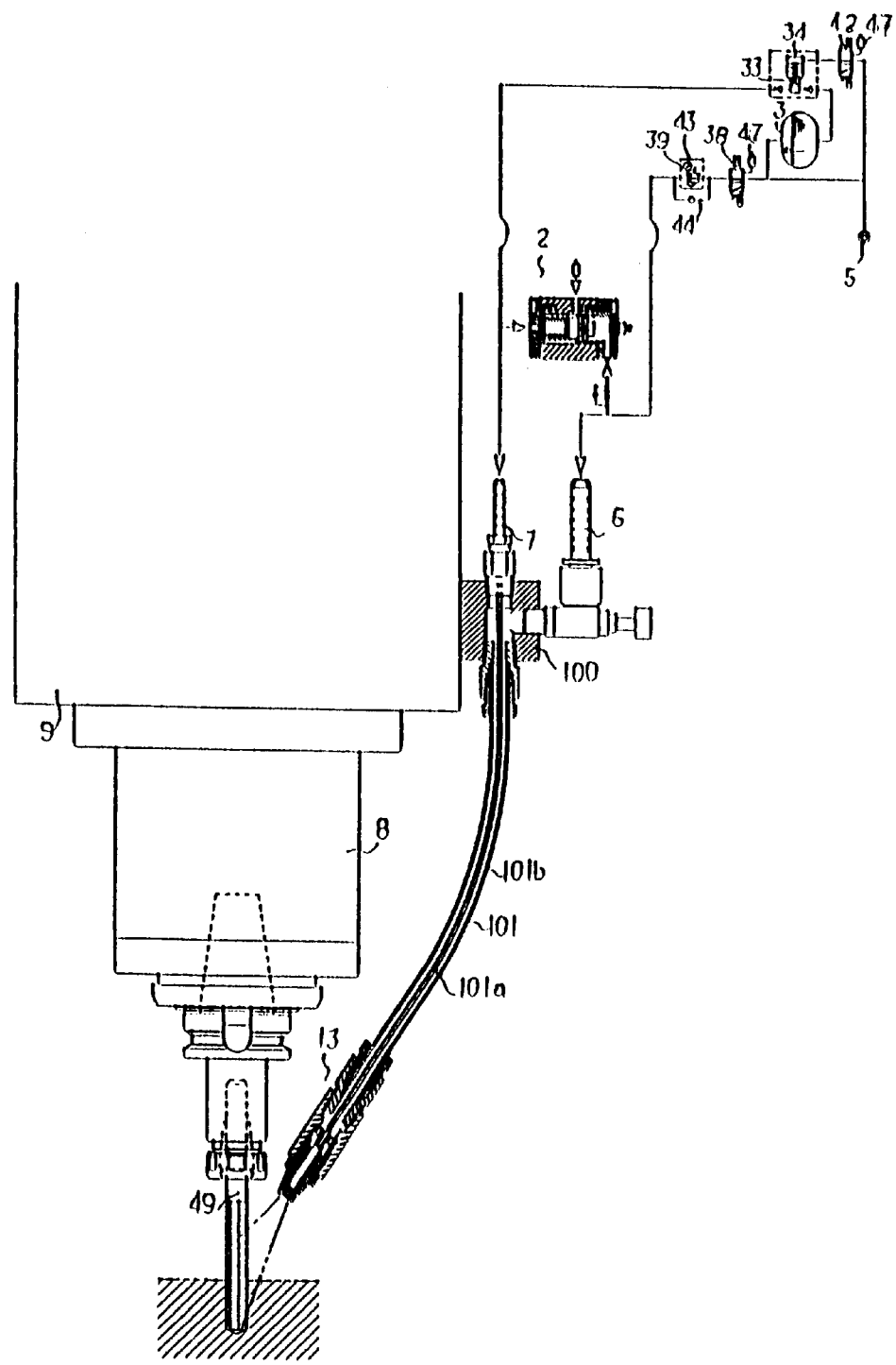
FIG. 5 shows a modification of the above embodiment.

FIG. 5 shows a modified example of the above embodiment. Here, the mist generating device 13 is located around the spindle 8. The mist generating device 13 mixes the compressed air fed from the feed line 6 and the coolant fed from the feed line 7, producing a coolant mist at the tip. Then, it spouts the mist toward a portion to be cut by the cutting edge 49.

In this case, though the above valve 23 is not provided to a coolant inflow portion of the mist generating device 13, it may be given at need.

The feed lines 6, 7 around the spindle 8 are connected to a joint 100 fixed on the holding cylinder 9, and from the joint 100 they are elongated to connect to the mist generating device 13 through a deformable double tube 101. Here, a central path 101a of the double tube 101 is for the coolant, while a looped path 101b around it is for the compressed air.

UTILITY VALUE IN THE INDUSTRY

The present invention has the following effects.

According to claim 1, right after the feed pump stops feeding the coolant, the means for sucking and discharging the coolant lowers the coolant pressure within the feed line by sucking a fixed amount of coolant. Accordingly, usual liquid dropping and related various bad influences are prevented.

According to claim 2, right after the feed pump stops feeding the coolant, the coolant sucking and delivering means lowers the coolant pressure within the feed line by sucking a fixed amount of coolant, thereby closing the valve means at once. Accordingly, usual liquid dropping and related various bad influences are prevented.

Besides, as soon as the feed pump begins feeding the coolant again, the coolant sucking and delivering means raises the coolant pressure by spouting a fixed amount of coolant sucked into the feed line previously. Therefore, the valve means opens at once, and then the coolant is fed into the mist generating device. Accordingly, a time-lag between the onset of feeding the coolant from the feed pump and production of the mist by the mist generating device is diminished.

According to claim 3, the coolant inside the feed line can be sucked and discharged by simple and firm mechanism.

According to claim 4, the feed means for the compressed air, which is necessary to produce the mist, can be partially used as a driving coolant sucking and delivering means, and therefor its mechanism is simplified. Besides, feed of the compressed air into the mist generating device can be connected to drive of the coolant sucking and delivering means without any complicated control device.

What is claimed is:

1. A coolant feeding device of a machine tool that feeds the coolant from a feed pump (4) to a mist generating device (13) on the tip of a spindle (8) by way of a feed line (7):
   wherein a cylinder chamber (28) for compressed air and a cylinder chamber (29) for coolant are provided oppositely;
   wherein pistons (30) (31) are provided to said cylinder chambers (28) (29), respectively, and integrated into one body;
   wherein a coolant sucking and delivering means (2) is provided with a compression spring (32) to press said pistons in a specific direction for each cylinder chamber;
   wherein said coolant sucking and delivering means (2) sucks a fixed amount of coolant in the feed line (7) when the feed pump (4) stops feeding the coolant; and
   wherein said coolant sucking and delivering means (2) feeds a fixed amount of coolant into the feed line (7) when the feed pump (4) begins feeding the coolant.

2. A coolant feeding device of a machine tool as set forth in claim 1, wherein said coolant sucking and delivering means (2) sucks the coolant from the feed line (7) into the cylinder chamber (29), and spouts the coolant into the feed line at need.

3. A coolant feeding device of a machine tool as set forth in claim 1, wherein said piston (31) provided to the cylinder chamber (29) is driven by compressed air to be fed into the mist generating device (13) for producing mist.

4. A coolant feeding device of a machine tool that feeds the coolant from a feed pump (4) to a mist generating device (13) on the tip of a spindle (8) by way of a feed line (7):

wherein a cylinder chamber (28) for compressed air and a cylinder chamber (29) for coolant are provided oppositely;

wherein pistons (30) (31) are provided to said cylinder chambers (28) (29), respectively, and integrated into one body;

wherein a coolant sucking and delivering means (2) is provided with a compression spring (32) to press said pistons in a specific direction for each cylinder chamber;

wherein said coolant sucking and delivering means sucks a fixed amount of coolant in the feed line (7) when the feed pump (4) stops feeding the coolant;

wherein said coolant sucking and delivering means feeds a fixed amount of coolant into the feed line (7) when the feed pump (4) begins feeding the coolant;

wherein valve means (23) is provided to a coolant inlet of the mist generating device (13); and wherein said valve means (23) closes when coolant pressure within the feed line (7) decreases to below a fixed level.

5. A coolant feeding device of a machine tool as set forth in claim 4, wherein said coolant sucking and delivering means (2) sucks the coolant from the feed line (7) into the cylinder chamber (29), and spouts the coolant into the feed line at need.

6. A coolant feeding device of a machine tool as set forth in claim 4, wherein said piston (31) provided to the cylinder chamber (29) is driven by compressed air to be fed into the mist generating device (13) for producing mist.

* * * * *